United States Patent [19]

Lew

[11] 4,399,469

[45] Aug. 16, 1983

[54] IMAGING SYSTEM AND METHOD WITH IMPROVED BOUNDARY DETECTION

[75] Inventor: Yung Lew, Huntington Beach, Calif.

[73] Assignee: American Hoechst Corporation, Somerville, N.J.

[21] Appl. No.: 142,974

[22] Filed: Apr. 23, 1980

[51] Int. Cl.³ .......................................... H04M 1/40
[52] U.S. Cl. ................................. 358/282; 358/280
[58] Field of Search ............... 358/256, 282, 284, 285, 358/138, 166, 212, 280, 293, 294

[56] References Cited

U.S. PATENT DOCUMENTS

| | | | |
|---|---|---|---|
| 2,975,371 | 3/1961 | Greanias | 328/168 |
| 4,227,218 | 10/1980 | Vandling | 358/282 |
| 4,247,873 | 1/1981 | Decuyper | 358/282 |

FOREIGN PATENT DOCUMENTS 1518177 7/1978 United Kingdom .

Primary Examiner—Robert L. Griffin
Assistant Examiner—Edward L. Coles
Attorney, Agent, or Firm—Flehr, Hohbach, Test, Albritton & Herbert

[57] ABSTRACT

System and method for reproducing images having areas of different color density scanned by a beam. A signal corresponding to an average level of color density within the target area of the beam is provided and compared with the signal from the central portion of the target area to detect the boundaries between the areas of different color density.

8 Claims, 3 Drawing Figures

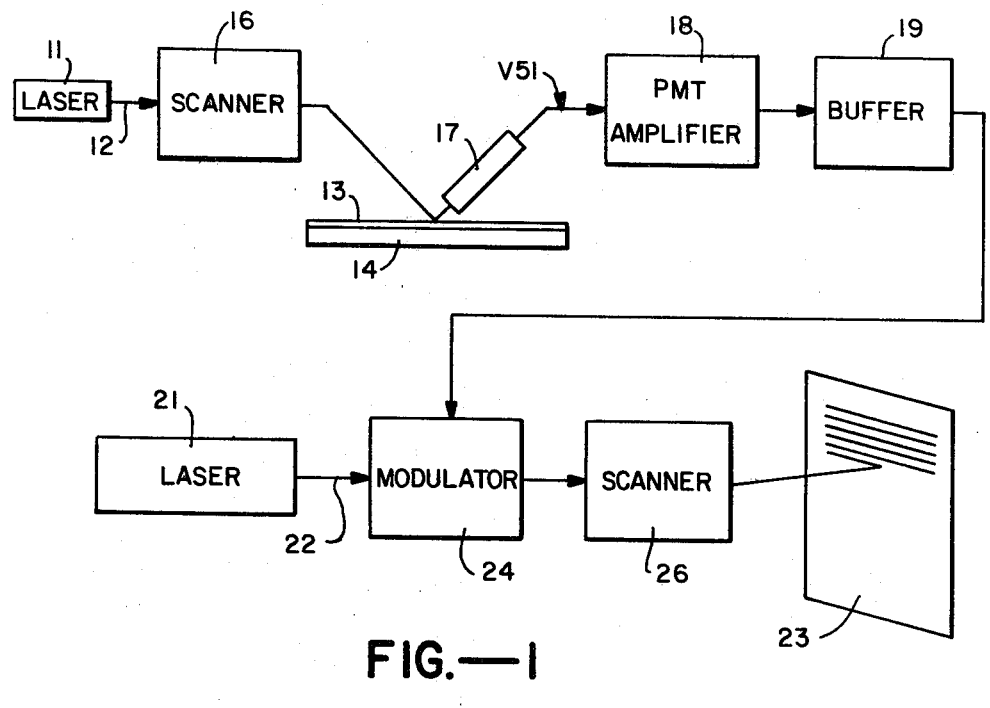
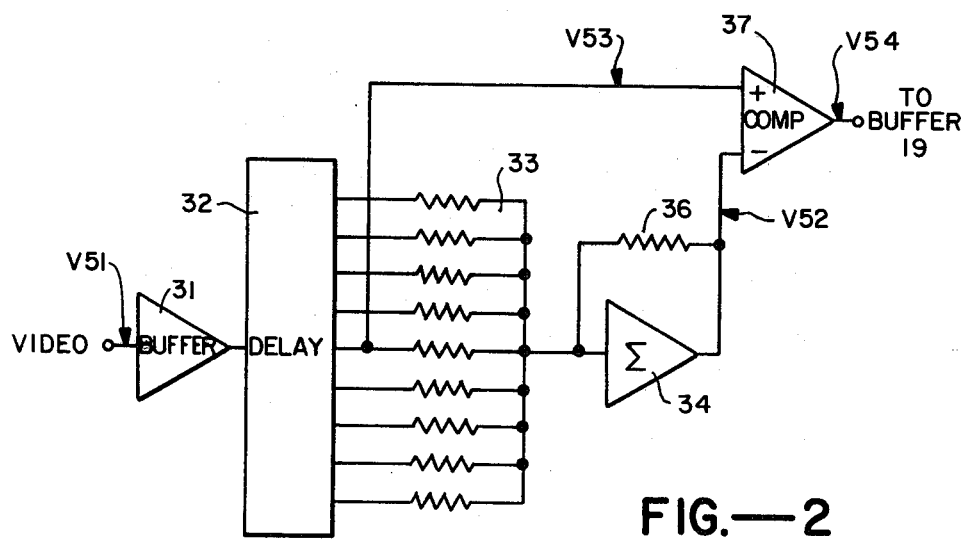

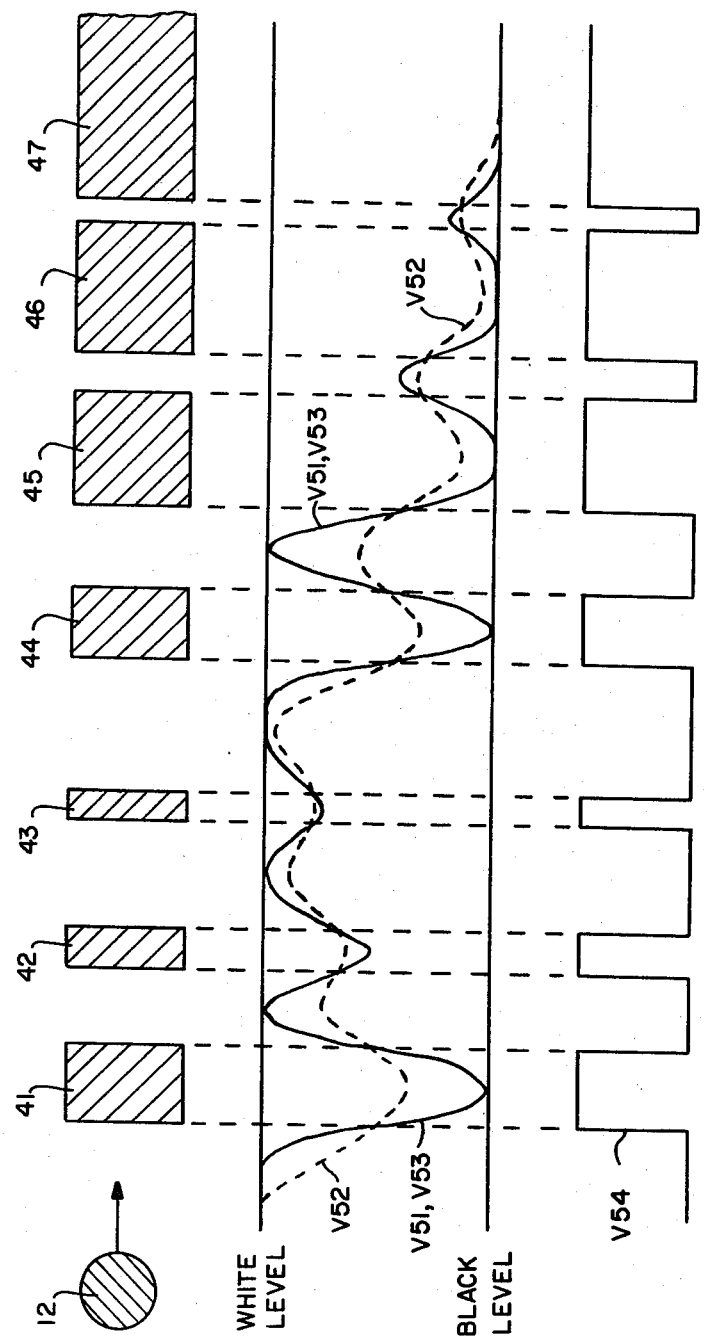
FIG.—3

IMAGING SYSTEM AND METHOD WITH IMPROVED BOUNDARY DETECTION

BACKGROUND OF THE INVENTION a. Field of the Invention

This invention pertains generally to imaging systems and methods and more particularly to a system and method for reproduction of an image scanned by a beam.

b. Description of the Prior Art

When an image on a medium is scanned for conversion to an electrical video signal, the modulation transfer function of the video signal is limited in bandwidth by the target area or size of the beam, scattering of light in the medium, and the bandwidth of the circuitry in which the video signal is generated and processed. This limited bandwidth can result in inadequate resolution for proper reproduction of the image. This problem arises, for example, at the boundaries between areas of different color density in halftone images scanned in a laser engraving system. The level of the video signal at the boundaries varies with the width and color levels of the areas, and consequently the boundaries cannot be detected by a simple level detector.

Heretofore, the boundaries between areas of different color density have been detected by changes in the slope of the video signals. However, this technique has not provided satisfactory results because the magnitude of the change in slope is dependent upon the width of the colored areas and the magnitude of the video signal, as well as the change in color itself. Accordingly, it has not been possible to determine the positions of the boundaries accurately with a slope detector.

OBJECTS AND SUMMARY OF THE INVENTION

It is in general an object of the invention to provide a new and improved system and method for the reproduction of images scanned by a beam.

Another object of the invention is to provide a system and method of the above character which provides improved resolution in the output image through more accurate detection of boundaries between areas of different color density.

These and other objects are achieved in accordance with the invention by monitoring the video signal to determine an average level of color density within the target area of the beam. The color level at the center of the target area is compared with the average color level to determine the location of boundaries between areas of different color density.

BRIEF DESCRIPTION OF THE DRAWINGS

FIG. 1 is a simplified block diagram of one embodiment of an imaging system incorporating the invention.

FIG. 2 is a circuit diagram of a portion of the imaging system of FIG. 1.

FIG. 3 is a waveform diagram illustrating the operation of the invention in detecting boundaries between areas of different color density.

DESCRIPTION OF THE PREFERRED EMBODIMENTS

As illustrated in FIG. 1, the system includes a laser 11 which generates a reading beam 12 for scanning a paste-up or other copy mounted on a copyboard 14. The beam passes through a scanner 16 which deflects the beam so that it scans along successive lines on the input copy in raster fashion.

A fiber optic array 17 is positioned for receiving light reflected by the input copy from the reading beam. This array comprises a plurality of fiber optic strands, with one end of the strands being arranged in a line generally parallel to the scan lines on the input copy. The other ends of the fibers are drawn together in proximity to a photomultiplier tube, or other suitable photodetector, which provides an electrical signal corresponding to the information scanned from the copy by the reading beam. This signal is applied to an amplifier 18, then digitialized and stored in a buffer 19.

The system also includes a laser 21 which generates a writing beam for reproducing an image of the input data on an output medium 23 such as a printing plate. The writing beam is modulated by a modulator 24 in accordance with the data stored in buffer 19, and the modulated beam is deflected across the output medium in raster fashion by a scanner 26. In a system in which the output medium is scanned simultaneously with the input copy, the reading and writing beams are advantageously deflected together along a common optical path by the same scanning elements, in which case scanners 16 and 26 can be a single unit. In a facsimile system where the reading and writing stations are separated, separate scanners are employed, and spatially encoded clock signals are employed to provide synchronization between the reading and writing beams, as described in detail in U.S. Pat. No. 4,081,842.

As illustrated in FIG. 2, the video signal from the photomultiplier tube associated with fiber optic array 17 is applied to the input of a buffer amplifier 31. The output of this amplifier is connected to the input of a delay network 32 which, in the embodiment illustrated, has nine output lines for providing output signals of equal temporal separation. Since the reading beam scans at a constant speed, the time lag between successive ones of the delayed signals corresponds to a fixed distance on the input copy. The total amount of delay is chosen to correspond to the width of the target area on the input copy so that the delayed video signals represent the level of light reflected by individual regions of the copy throughout the target area of the beam.

Means is provided for providing a weighted average of the video signals from delay network 32. This means comprises a weighting network 33 and a summing amplifier 34. The weighting network comprises a plurality of resistors connected between the output lines of the delay network and the input of the summing amplifier. The values of these resistors can be selected to provide any desired weighting of the delayed signals in determining the color level to be used as a reference. The gain of amplifier 34 is determined by the relative values of the weighting network resistors and a gain setting resistor 36 which is connected between the output and input of the amplifier. In one presently preferred embodiment, all of the resistors in the weighting network are chosen to be of equal value so that all regions of the target area contribute equally to the average color level signal.

Means is provided for comparing the video signal for a predetermined region of the target area with the average color level signal to provide an output signal when the regional signal reaches a predetermined level relative to the average color level signal. This means comprises a comparator 37 having the central output line of delay network 32 connected to one input thereof. The output of summing amplifier 34 is connected to the second, or reference input of the comparator. The output of comparator 37 is connected to the input of buffer 19.

Operation and use of the system of FIGS. 1-2, and therein the method of the invention, can now be described. As the reading beam scans across the input copy, delay network 32 provides temporary storage for video signals from nine equally spaced regions on the copy. Since these regions extend across the target area of the beam, the average of the stored signals corresponds to an average color level for the entire target area. The video signal for the central portion of the beam is compared with the average color level signal for the entire target area, and at the boundaries between areas of different color density, the signals applied to the comparator are equal. The output signals from the comparator are stored in buffer 19 to control the modulation of writing beam 22.

The operation of the invention can be further understood with reference to FIG. 3. In this figure, reading beam 12 is shown scanning along a line containing a plurality of black bars 41-47 spaced apart on a white background. The bars have different widths, but their leading edges are spaced equally along the scan line. The video signal V51 produced by the photomultiplier tube associated with fiber optic array 17 varies in a generally sinusoidal fashion as the beam scans across the black bars and the white spaces between the bars. The amplitude of the signal varies in accordance with the respective widths of the black and white areas scanned by the beam. Thus, where the bars are narrower, the amplitude remains closer to the white level, and where the bars are wider, the amplitude remains closer to the black level.

The average color level signal V52 varies generally sinusoidally in phase with the input video signal V51. The amplitude variations of signal V52 are generally less than those of signal V51, as illustrated in FIG. 3. The delayed video signal V53 at the center of the target area is similar to input signal V51, and for convenience of illustration these two signals are represented by the same waveform in FIG. 3.

The output signal V54 of comparator 37 is dependent upon the relative levels of signals V52 and V53. As illustrated, these signals cross at the boundaries of the bars, and the comparator output is high when video signal V53 is below the level of reference signal V52 and low when the video signal is above the level of the reference signal. For a positive imaging system, the writing beam is turned on when the comparator output is low and off when the comparator output is high. For a negative output image, the beam is turned on when the comparator is high and off when it is low.

The invention has a number of important features and advantages. It provides a reference signal of varying amplitude which permits boundaries between areas of different color density in an image to be accurately located. This results in greater resolution and better output image quality.

It is apparent from the foregoing that a new and improved imaging system and method have been provided. While only certain presently preferred embodiments have been described in detail, as will be apparent to those familiar with the art, certain changes can be made without departing from the scope of the invention as defined by the following claims.

I claim:

1. In a method for detecting a boundary between two areas of different color density in an object from an electrical signal representative of light reflected by the object from a beam of predetermined target area scanning across the object, the steps of: processing the electrical signal to provide an average color level signal corresponding to an average lever of color density within the target area of the beam, sampling the electrical signal to provide a regional color level signal corresponding to the color level in a predetermined region of the target area, comparing the regional color level signal with the average color level signal, and providing an output signal when the regional signal reaches a predetermined level relative to the average signal.

2. The method of claim 1 wherein the average color level signal is provided by storing signals corresponding to the electrical signal at different times as the beam scans across a predetermined portion of the target area, weighting the stored signals in a predetermined manner, and averaging the weighted signals to provide the average color level signal.

3. The method of claim 2 wherein the electrical signal is applied to a delay line to provide the stored signals.

4. In a system for detecting a boundary between two areas of different color density in an object from an electrical signal representative of light reflected by the object from a beam of predetermined target area scanning across the object: means responsive to the electrical signal for providing an average color level signal corresponding to an average level of color density within the target area of the beam, means for sampling the electrical signal to provide a regional color level signal corresponding to a color level in a predetermined region of the target area, and means for comparing the regional color level signal with the average color level signal to provide an output signal corresponding to the relative levels of the regional and average color level signals.

5. In a method for forming an image of an object having areas of different color level, the steps of: scanning the object with a beam of predetermined target area and providing an electrical signal correponding to light deflected by the object from the beam, passing the electrical signal through a delay network having a plurality of temporally spaced outputs to provide a series of signals corresponding to the color level in different regions of the target area as it scans across the object, combining the temporally delayed signals to provide a signal corresponding to an average level of color density within the target area, comparing the delayed signal corresponding to a central region of the target area with the average color level signal, scanning a writing beam of variable intensity across an output medium, and changing the intensity of the writing beam to begin an area of different color when the central region signal reaches a predetermined level relative to the average color level signal.

6. In a system for forming an image of an object having areas of different color level: means for scanning the object with a beam of predetermined target area, means responsive to light reflected by the object from the beam for providing an electrical signal corresponding to the image to be formed, a delay line responsive to the electrical signal having a plurality of temporally displaced outputs for providing a series of signals corresponding to the color level in different regions of the target area as it scans across the object, means for combining the signals from the delay line to provide an average color level signal corresponding to an average level of color density within the target area, means for comparing the delayed signal coresonding to a central region of the target area with the average color level signal means for scanning a writing beam of variable intensity across an output medium on which the image of the object is to be formed, and means responsive to the output of the comparator means for modulating the writing beam in accordance with the relative levels of the central region signal and the average color level signal.

7. In a method for detecting a boundary between two areas of different color density in an object from an electrical signal representative of light reflected by the object from a beam of predetermined target areas scanning across the object, the steps of: providing a plurality of signals corresponding to the electrical signal at different times as the beam scans across a predetermined portion of the target area, averaging said plurality of signals to provide an average color level signal corresponding to an average level of color density within the target area of the beam, sampling one of the plurality of signals to provide a regional color level signal corresponding to the color level in the central region of the target area, comparing the regional color level signal with the average color level signal, and providing an output signal when the regional signal reaches a predetermined level relative to the average signal.

8. In a system for detecting a boundary between two areas of different color density in an object from an electrical signal representative of light reflected by the object from a beam of predetermined target area scanning across the object: means responsive to the electrical signal for providing an average color level signal corresponding to an average level of color density within the target area of the beam, said means comprising a delay line having a plurality of temporally separated outputs and means for providing a weighted average of the temporally separated output signals from the delay line, means for sampling the electrical signal to provide a regional color level signal corresponding to a color level in a predetermined region of the target area, and means for comparing the regional color level signal with the average color level signal to provide an output signal corresponding to the relative levels of the regional and average color level signals.

* * * * *